UNITED STATES PATENT OFFICE.

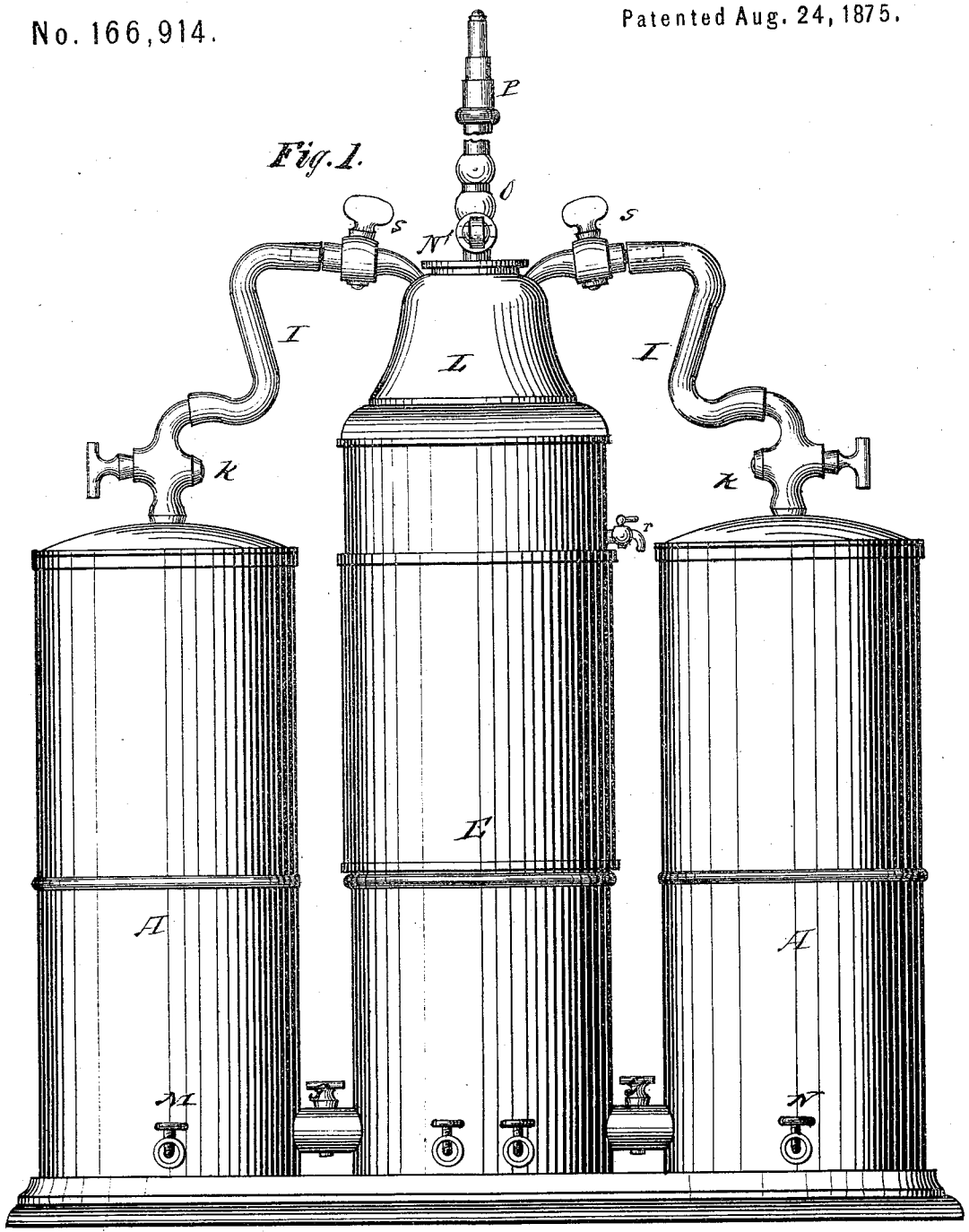

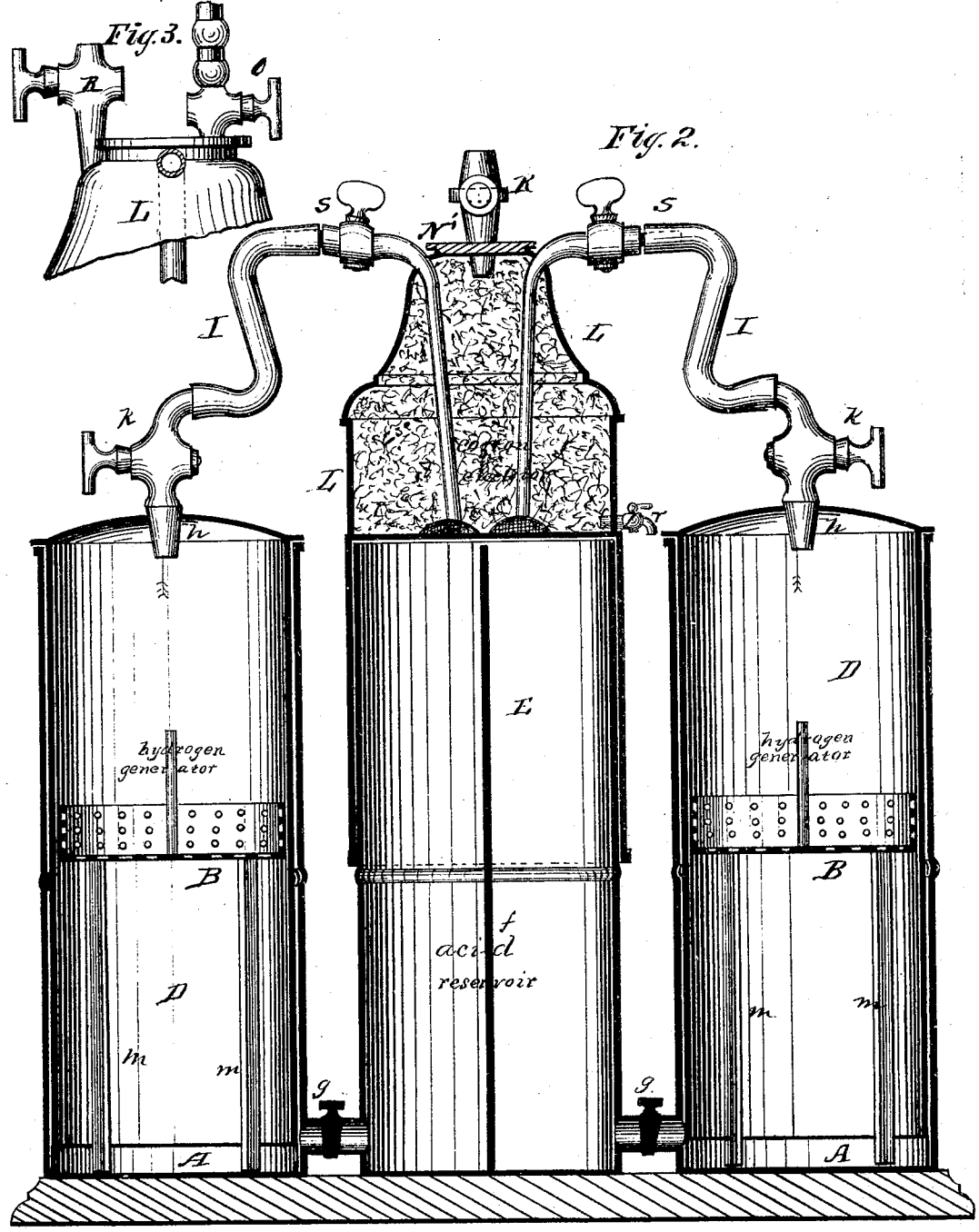

JAMES M. CLARK, OF LANCASTER, PENNSYLVANIA.

IMPROVEMENT IN PORTABLE CARBURETED-HYDROGEN-GAS MACHINES.

Specification forming part of Letters Patent No. 166,914, dated August 24, 1875; application filed July 15, 1875.

*To all whom it may concern:*

Be it known that I, JAMES M. CLARK, of Lancaster, in the county of Lancaster and State of Pennsylvania, have invented certain new and useful Improvements in Portable Carbureted-Hydrogen-Gas Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in certain improvements in that class of gas-machines by which simple hydrogen gas is first produced, and afterward changed to a pure, brilliant, and cheap illuminating-gas by being carbureted from contact with any of the volatile liquid hydrocarbons, as will be hereinafter more fully set forth.

In the annexed drawing, Figure 1 is a side elevation of my machine. Fig. 2 is a vertical section of the same.

A A represent two cylindrical vessels, of any desired dimensions and of any suitable material, and are open at the top. E represents another vessel, also open at the top, and provided with a vertical partition, $f$, in the center. The bottoms of these vessels are supplied with acidulated water to a suitable depth, and stop-cocks $g$ $g$ connect the vessels A and E together, so that the acidulated water can pass and repass from one to the other. In each vessel A is placed a perforated basin, B, supported upon legs $m$ $m$, or otherwise retained in position a suitable distance above the bottoms of said vessels. In the upper end of each vessel A is inserted an inverted cylinder, D, forming an air-tight joint at the top of the vessel, and extending down into the same far enough so that the basin B will be up in said inverted cylinder about three-fourths of its length from the lower end. The vessels A, with their inverted cylindrical chambers D, form the hydrogen-departments of my machine, and from which the hydrogen gas escapes as it is generated through apertures $h$ in the top. $k$ $k$ are stop-cocks, also to allow this gas to escape through pipes I and through stop-cocks $s$ down into the carbon-department L at or near the bottom thereof. At these ends of the pipes are stretched pieces of wire-gauze, which act as a distributer of the hydrogen gas, and cause it to spread through the carbon-department. The carbon-department is filled with excelsior and cotton strands or threads in about equal proportions. The cotton strands take up a large amount of the volatile carbon-oil, and the excelsior prevents the cotton from packing too close, and by its elasticity keeps the cotton strands sufficiently far apart to allow the hydrogen gas to pass up through it to the point of burning, and thus properly proportion the hydrogen and carbon. M and N are stop-cocks and pipes for drawing off the acidulated water when unfit for use. O is also another pipe and stop-cock to conduct the gas to the burner P. R is a stop-cock, which may be connected with the service-pipes of a building for distributing gas to the burners. $r$ is a stop-cock for drawing off the carbon-oil when desired. This carbon-department may be placed on top of the vessel E, or alongside of it, as desired. N' is the inlet to the carbon-department, through which the hydrocarbon liquid is introduced. The filling used in the carbon-department L holds the carbon, and acts as a governor to proportion it to the hydrogen gas, so that the hydrogen takes up just a sufficiency of the carbon to make the constituent parts of this carbureted-hydrogen gas the same as coal-gas, or nearly so.

By combining two or more hydrogen-gas generators in one machine I gain several important advantages.

Both of the generators A A are charged to make hydrogen gas, and are to be used separately or both together. As the carbon-department is common to carbonize the hydrogen from either of the generators A, I commence only to use one generator, leaving the other in reserve, and when the first one used needs recharging, or when the acidulated water and the iron in the basin has become too weak to give off the proper amount of gas to supply the lights, the other generator is brought into action, thereby always keeping up the proper amount and quality of gas, while at the same time I allow the first-used generator to continue making all the gas the now weak acidulated water and iron in it is able to make, for it will be seen that with this combination sufficient time may be given to these weak materials to set free the remaining hydrogen gas they possess, thereby saving what would otherwise be wasted.

It will thus be seen that I use first only one generator until the lights indicate that hydrogen is not generated fast enough, and then the other generator is brought into action, both generators then working together until all the hydrogen is set free from the materials in the first generator. This generator is then recharged and the operation continued. If required, both the generators may be put to work at one time to deliver hydrogen into the carbureter.

My machine is automatic in its operation—that is to say, by placing a sufficient quantity of acidulated water in the vessel E, and allowing it to rise in the vessels A A until it covers the basins B B, and said basins being filled with iron chips or scraps, and charging the carbon-department L with some volatile hydrocarbon liquid, the machine is ready for work.

In charging the hydrogen-departments the stop-cocks k k must be closed, and the stop-cocks g g opened. By then opening either of the stop-cocks k the generator to which it belongs will immediately commence to make gas and deliver it in the carbon-department, as before described. When the stop-cock k is closed, that generator instantly ceases to make gas and is at rest. This is caused by the acidulated water acting upon the iron in the basin and setting free a comparatively pure hydrogen gas, which will rise to the upper portion of the chamber D and accumulate therein until the pressure produced by said gas, the stop-cock k being closed, is sufficient to force the water into the vessel E through the stop-cock g and away from the iron in the basin, when it, of course, ceases to make gas. As soon as the pressure is relieved by opening the stop-cock k, the water rises again and gas-making is at once resumed.

The chambers D can be easily removed for cleaning the vessels A and basins B, and for filling said basins with iron, and the acidulated water, when no longer fit for use, is drawn off through suitable stop-cocks, or only a portion may be drawn off by closing the stop-cocks g, thus retaining the water contained in the vessel E.

In order to charge the carbon-department during the process of carbureting, I propose to connect a tube or vessel therewith, and regulate the flow of oil therefrom by suitable stop-cocks.

Instead of using three vessels, A A and E, the latter being divided by a partition into two compartments, I may use four vessels, made out of ordinary tight barrels, in which case, of course, no partitions are required.

Having thus fully described my invention, what I claim as new, and desire to secure by Letters Patent, is—

1. An independent acid-reservoir, in combination with two or more generators, constructed and connected therewith substantially as shown and described, whereby the gas from each may be thoroughly exhausted and a steady flame preserved, as specified.

2. The reservoir E, divided by a partition, f, into two separate chambers, and connected with the generators A by stop-cocks g, substantially as shown, and for the purposes set forth.

3. The generator A, fitted with an inverted bell, D, and having a perforated vessel, B, supported therein, in combination with the acid-tank E and carbon-department L, all constructed and operating as specified.

4. The vessels A E and inverted bell D, in combination with the carbon-department L, pipe I, and stop-cock k, for the purposes set forth.

5. The carbon-vessel L, provided with a burner and service-pipe connection, and having a pipe from each generator passing through a packing of cotton and excelsior therein, in combination with the independent acid-tank E and generators A, substantially as and for the purpose described.

In testimony that I claim the foregoing as my own I affix my signature in presence of two witnesses.

JAMES M. CLARK.

Witnesses:
W. B. WILEY,
A. F. SHENCK.